(12) United States Patent
Deimel et al.

(10) Patent No.: US 7,346,893 B2
(45) Date of Patent: Mar. 18, 2008

(54) EXCHANGE INFRASTRUCTURE SYSTEM AND METHOD

(75) Inventors: Anton Deimel, Malschenberg (DE); Walter Kirchgassner, Schönborn (DE); Christian Lienert, Griesheim (DE); Holger Meinert, Mühlhausen (DE); Kurt Reiner, Oftersheim (DE); Paul Weber, Wiesloch (DE)

(73) Assignee: SAP AG, Walldorf, DE (US)

( * ) Notice: Subject to any disclaimer, the term of this patent is extended or adjusted under 35 U.S.C. 154(b) by 568 days.

(21) Appl. No.: 10/402,349

(22) Filed: Mar. 27, 2003

(65) Prior Publication Data
US 2004/0068714 A1 Apr. 8, 2004

Related U.S. Application Data

(60) Provisional application No. 60/368,848, filed on Mar. 28, 2002.

(51) Int. Cl.
*G06F 9/44* (2006.01)
(52) U.S. Cl. .................. 717/121; 717/106; 717/108
(58) Field of Classification Search ......... 717/100–123
See application file for complete search history.

(56) References Cited

U.S. PATENT DOCUMENTS

| | | | | |
|---|---|---|---|---|
| 5,519,875 A | * | 5/1996 | Yokoyama et al. | 719/316 |
| 5,524,253 A | * | 6/1996 | Pham et al. | 709/202 |
| 6,256,676 B1 | * | 7/2001 | Taylor et al. | 709/246 |
| 6,678,882 B1 | * | 1/2004 | Hurley et al. | 717/121 |
| 6,789,252 B1 | * | 9/2004 | Burke et al. | 717/100 |
| 2003/0046201 A1 | * | 3/2003 | Cheyer | 705/35 |

FOREIGN PATENT DOCUMENTS

WO WO 00/29948 5/2000

OTHER PUBLICATIONS

Bryan Costales with Eric Allman: "sendmail, Second Edition" Jan. 1, 1997, O'Reilly & Associates, Inc., Sebastopol, California, USA, pp. 5 and 23.

* cited by examiner

*Primary Examiner*—Tuan Dam
*Assistant Examiner*—Chuck Kendall
(74) *Attorney, Agent, or Firm*—Mintz, Levin, Cohn, Ferris, Glovsky and Popeo, P.C.

(57) ABSTRACT

An exchange infrastructure for message-based exchange and integration of a collection of heterogeneous software components is disclosed. The exchange infrastructure includes a repository for storing design-time collaboration descriptions of a plurality of software components, and a directory for storing configuration-specific collaboration descriptions of a runtime system landscape. The exchange infrastructure further includes a runtime engine configured for message-based exchange of information based on the configuration-specific collaboration descriptions. At runtime, the runtime engine receives messages, and resolves intended or required receivers based on message content and parameters provided by the configuration-specific collaboration descriptions from the directory.

20 Claims, 8 Drawing Sheets

EXCHANGE INFRASTRUCTURE SYSTEM AND METHOD

CROSS REFERENCE TO RELATED APPLICATIONS

This application claims priority to U.S. Provisional Patent Application No. 60/368,848, filed on Mar. 28, 2002.

TECHNICAL FIELD

The following description relates to enterprise systems and associated architectures and techniques for collaborative business processes.

BACKGROUND

Companies face an increasing need for integration of and collaboration among their information and enterprise software systems. In most current system landscapes, many components are directly connected in a one-to-one relationship with other components, with the integration capabilities hardwired into the application components and individual mappings programs. Under these conditions, collaborative sharing of information or process control is difficult if not impossible. Upgrades, changes, or extensions to an infrastructure of directly connected components are challenging and resource-intensive.

New electronic business collaboration, however, typically requires connectivity among all applications inside and outside of company boundaries. Networks such as the Internet provide opportunities for systems to communicate almost instantly with other systems or individuals. Business processes that once were restricted to intranets and their users are now moving to the Internet to become an effective composition of Web services. A Web service is a programmable, self-contained, self-describing, modular application function that can be published, discovered or invoked through an open Internet standard.

Processes such as supply chain planning, sourcing, and demand forecasting are automated across enterprises and within regions, and can be implemented across systems at only marginal communication costs. To achieve this result, components from different vendors ideally should be integrated into a consistent infrastructure. However, comprehensive system upgrades of existing enterprise software, or large-scale replacement strategies in heterogeneous system landscapes tend to be too costly or otherwise and simply unfeasible in terms of time and capital resource costs.

While technical connectivity is provided using open protocols and standards like the hypertext transfer protocol (HTTP) and extensible markup language (XML), the challenge of mapping different business semantics remains. To capture future rounds of efficiency gains, enterprises increasingly will be required to deploy a new breed of collaborative business processes that cross enterprises or functions within an enterprise. In addition, enterprises will increasingly need to process real-time scenarios instead of performing batch processing. These collaborative processes will have significantly more sophisticated integration requirements than traditional processes.

SUMMARY

This document discloses an exchange system and method that assists in integrating business process tools and applications. In one aspect a system for integrating a heterogeneous collection of software components is provided. The system includes a repository for storing design-time collaboration descriptions of a number of software components. The system also includes a directory for storing configuration-specific collaboration descriptions of a runtime system landscape. The runtime system landscape includes at least a portion of the software components described in the repository. The configuration-specific descriptions can be based at least in part on the design-time descriptions of the repository, and add configuration-specific information that is needed to execute message-based exchange of information.

The design-time collaboration descriptions include business scenarios, business processes, routing objects, message transformation mappings and message interfaces for the software components. The configuration-specific collaboration descriptions include runtime descriptions of the business scenarios, business processes, routing objects, message transformation mappings and message interfaces for each software component in the runtime system landscape. A system landscape directory is also disclosed. The system landscape directory includes design-time descriptions of the software components as well as configuration-specific descriptions of the runtime system landscape.

A method for integrating a heterogeneous collection of software components is also disclosed. In the method, design-time collaboration descriptions of a plurality of software components are stored in a repository. Configuration-specific collaboration descriptions of a runtime system landscape are then generated based on the design-time descriptions. The configuration-specific collaboration descriptions are stored in a directory. The directory is accessible by a runtime engine for executing the message-based exchange of information, according to one or more business processes set up by an enterprise. In the method, recipients of each message need not be specified, but the business processes are executed according at least in part to the content of each message and the parameters provided by the directory.

A method for integrating a heterogeneous collection of software components includes exchanging messages among software components in the runtime system landscape that are connected via an XI. The method includes receiving a message from a sending application, and determining a logical receiving application of the message based on routing rules defined according to configuration-specific collaboration descriptions stored in a directory. The method further includes mapping the message from an outbound interface description associated with the sending application to an inbound interface description associated with a logical receiving application. Accordingly, a method to resolve a physical address associated with a receiving application is disclosed, based at least in part on the content of the message and parameters provided by the directory.

Details of one or more implementations are set forth in the accompanying drawings and the description below. Other features and advantages may be apparent from the description and drawings, and from the claims.

BRIEF DESCRIPTION OF THE DRAWINGS

These and other aspects will now be described in detail with reference to the following drawings.

DETAILED DESCRIPTION

The systems and techniques described here relate to an exchange infrastructure for collaborative processing among various processing components.

Figure 1:
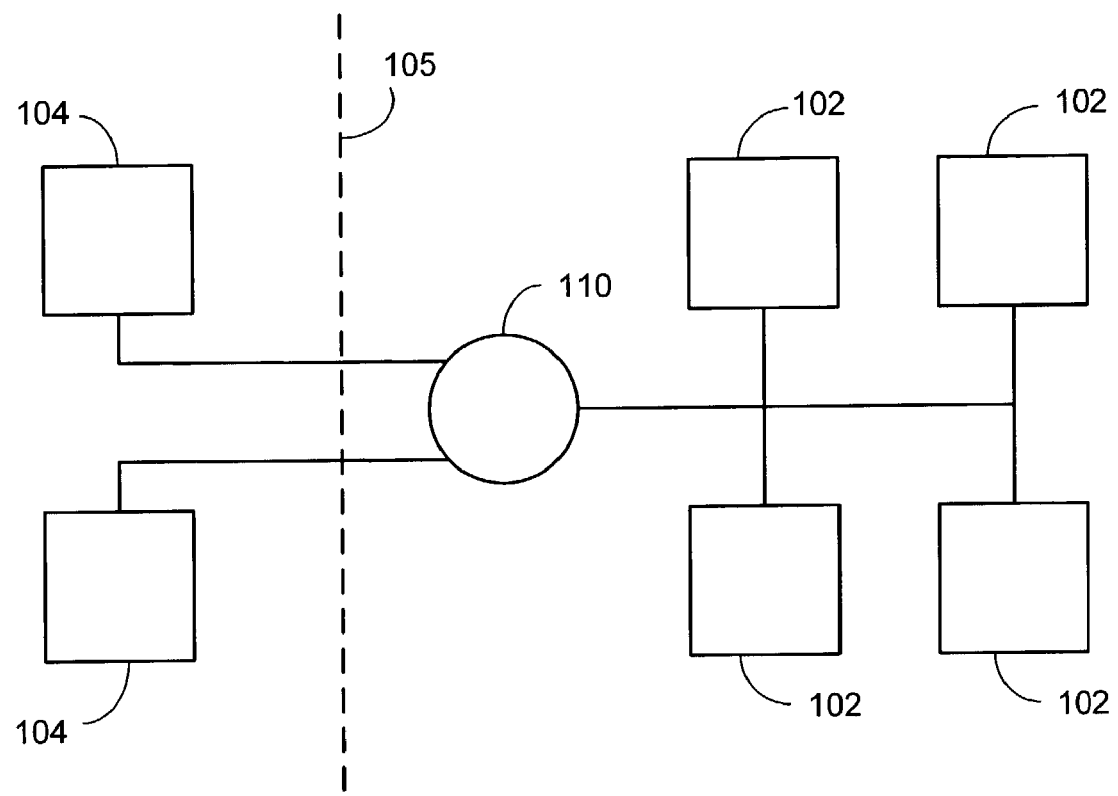
FIG. 1 is a simplified block diagram of an exchange system for integrated, message-based collaboration.

FIG. 1 is a simplified block diagram of a system 100 for exchange-based integration. The system 100 includes an exchange infrastructure (XI) 110 for collaborative processing among internal components (ICs) 102 of an enterprise, and between external components (ECs) 104 that communicate to one or more ICs 102 through a firewall 105. The ICs and ECs 102 and 104 represent any of a number of processes or services and their software and hardware, such as Web portals, buying or selling programs, electronic mail, business management programs, project planning programs, etc., and are preferably Web-based applications. Each of the ICs/ECs 102, 104 communicates with one or more other components according to at least one of a number of communication protocols or standards.

The XI 110 is a self-contained, modularized exchange platform for driving collaboration among the components 102, 104. The exchange infrastructure 110 includes a central integration repository and directory storing shared collaboration knowledge. The XI 110 supports open standards such as various standard markup languages like the extensible markup language (XML), web service description language (WSDL), and simple object access protocol (SOAP) to provide an abstraction of technical interfaces for the components 102, 104, and for message-based communications across heterogeneous component interfaces. The self-contained, modularized functions of the XI 110 can be provided as one or more Web services based on standard Internet technology, and therefore can be published, discovered, and accessed within a network of components 102, 104 using open standards.

Figure 2:
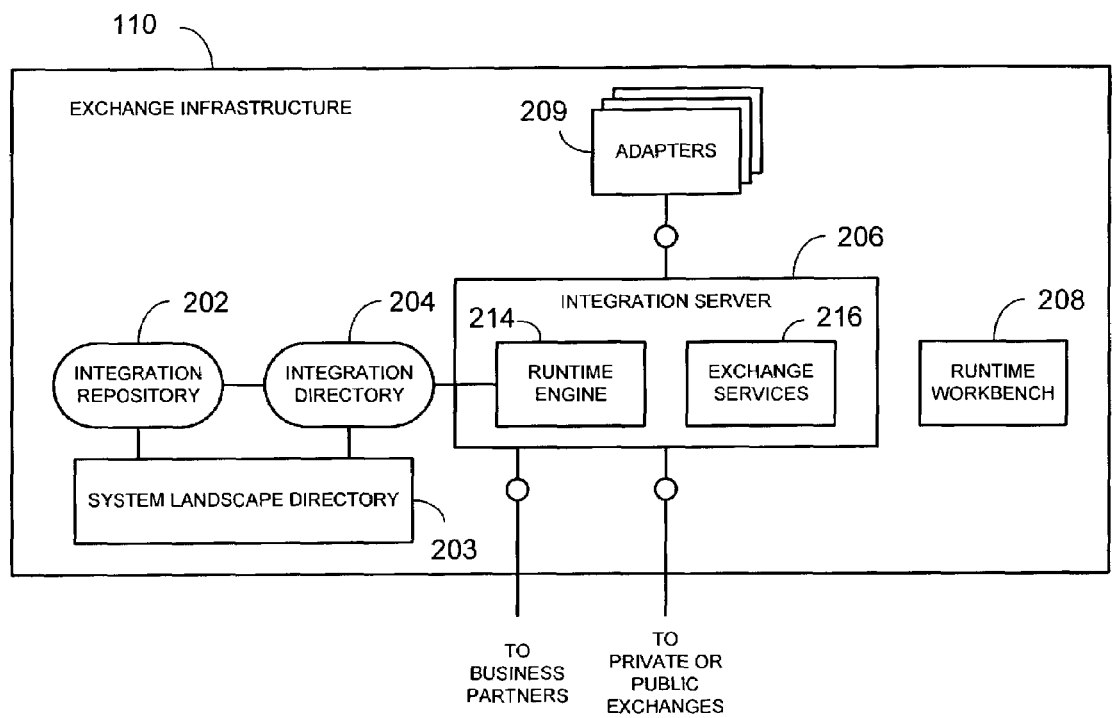
FIG. 2 is a detailed block diagram of an exchange infrastructure.

FIG. 2 is a block diagram of the XI 110. In general, the XI 110 includes an integration repository 202, an integration directory 204, a system landscape directory 203 and an integration server 206. The integration repository 202 captures design-time collaboration information about software components that collaborate with each other using the XI 110. The integration directory 204 captures runtime collaboration description, which includes storing and accessing actual component installations plus connectivity descriptions for external components, all of which represents the shared business semantics of a runtime system landscape. The design-time and runtime descriptions of the software components are stored in the system landscape directory 203. At runtime, the integration server 206 uses the shared business semantics from the integration directory 204 to execute collaborative processing and message exchange among active software components in the runtime system landscape.

The integration server 206 includes a runtime engine 214 that provides messaging and business process control at runtime for connecting services and managing the process flow of value chains. The integration server 206 also includes other exchange services 216 that typically require an application-specific implementation. The exchange services 216 include analytics and master data services. The exchange services 216 can have access to all business documents within the system landscape. For each enterprise, proprietary as well as third party components, including Web-based applications, communicates with the integration server via one of a number of adapters 209.

Like the integration repository 202 and integration directory 204, the integration server 206 is configured for deployment within any existing system infrastructure. The integration server 206 can be a dedicated server that applies the shared collaboration descriptions in the integration directory 204 of the supported system landscape in a runtime collaboration environment. A runtime workbench 208 includes a monitoring application to allow organizations or users manage the operation of the XI 110 reliably and efficiently.

Figure 3:
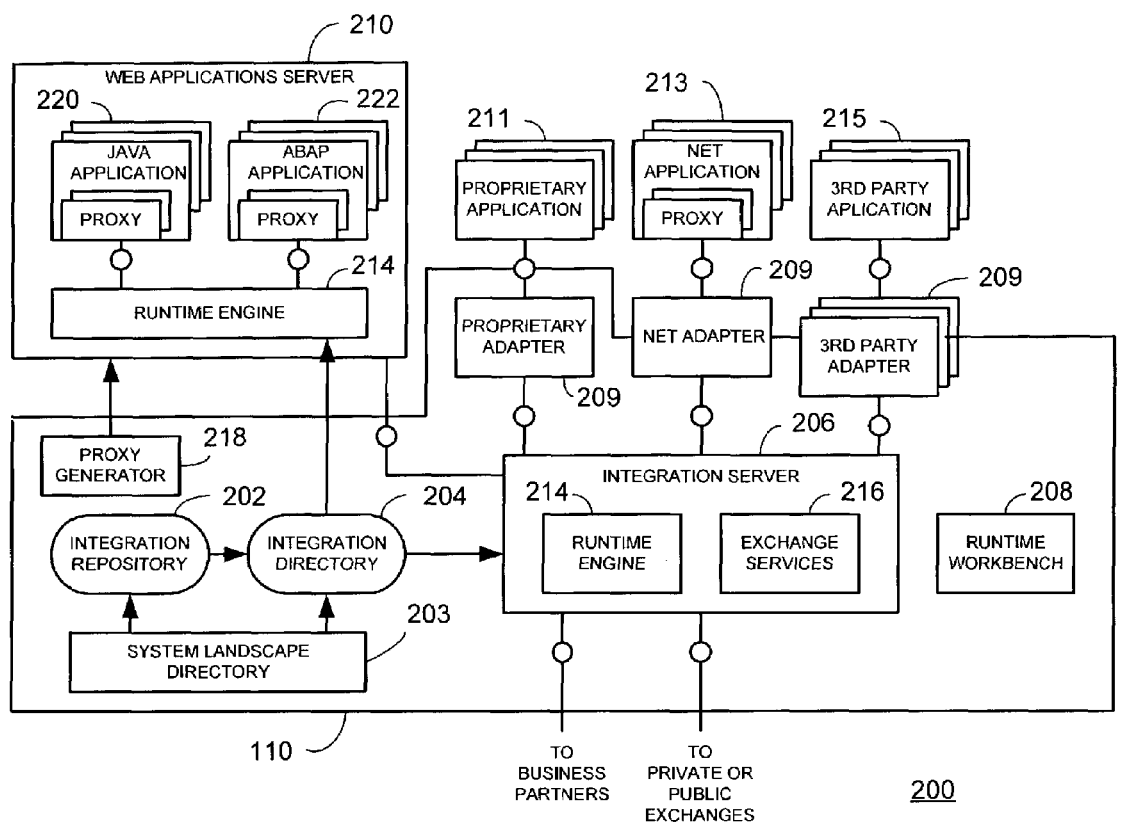
FIG. 3 is a detailed block diagram of a system landscape including an exchange infrastructure.

FIG. 3 is a block diagram of a system landscape 200 including an XI 110. The XI 110 includes various adapters 209 configured to provide connectivity between the integration server 206 and proprietary applications 211, Web-based services 213, and third party applications 215. The XI 110 also can include a Web Application Server 210 providing Web-based applications programmed according to standard computing platforms using web-specific programming languages such as Java and Advanced Business Application Programming (ABAP) language, for instance. The Web Application Server 210 also includes a runtime engine 214 for providing messaging and business process control between Web-based applications such as Java applications 220, ABAP applications 222, and/or other software components.

Using the XI 110, new interfaces can be defined for any application employing a proxy. The proxy hides the communication technology stack from the application, and presents the application with a programming language-dependent interface. Thus, the interface for the application can be implemented locally with the XI 110, and the proxy can implement all communication steps and eliminate the need to implement low-level communications from the XI 110 to the new interface.

A proxy generator 218 based on information stored on the integration repository 202 can generate proxies on demand. The proxy generator 218 uses the interface information described via a standard Web-based language such as WSDL or XML schema to create platform- and programming language-dependent code in the application development system. The communication logic can be implemented based on the proxy that represents the interface description of the respective development platform, such as Java, ABAP, and .NET for the web-based applications 213. The proxies convert platform-specific data types into XML on the outbound side and vice versa on the inbound side and provide access to the component-specific local runtime engine 214. On the outbound side, proxies are generated completely. Outbound proxies can be called via a service invocation provided by an application developer. On the inbound side, only proxy skeletons need to be generated, as implemented by the receiving application. Inbound proxies require the service implementation of the application that must be provided by the application developer.

Figure 4:
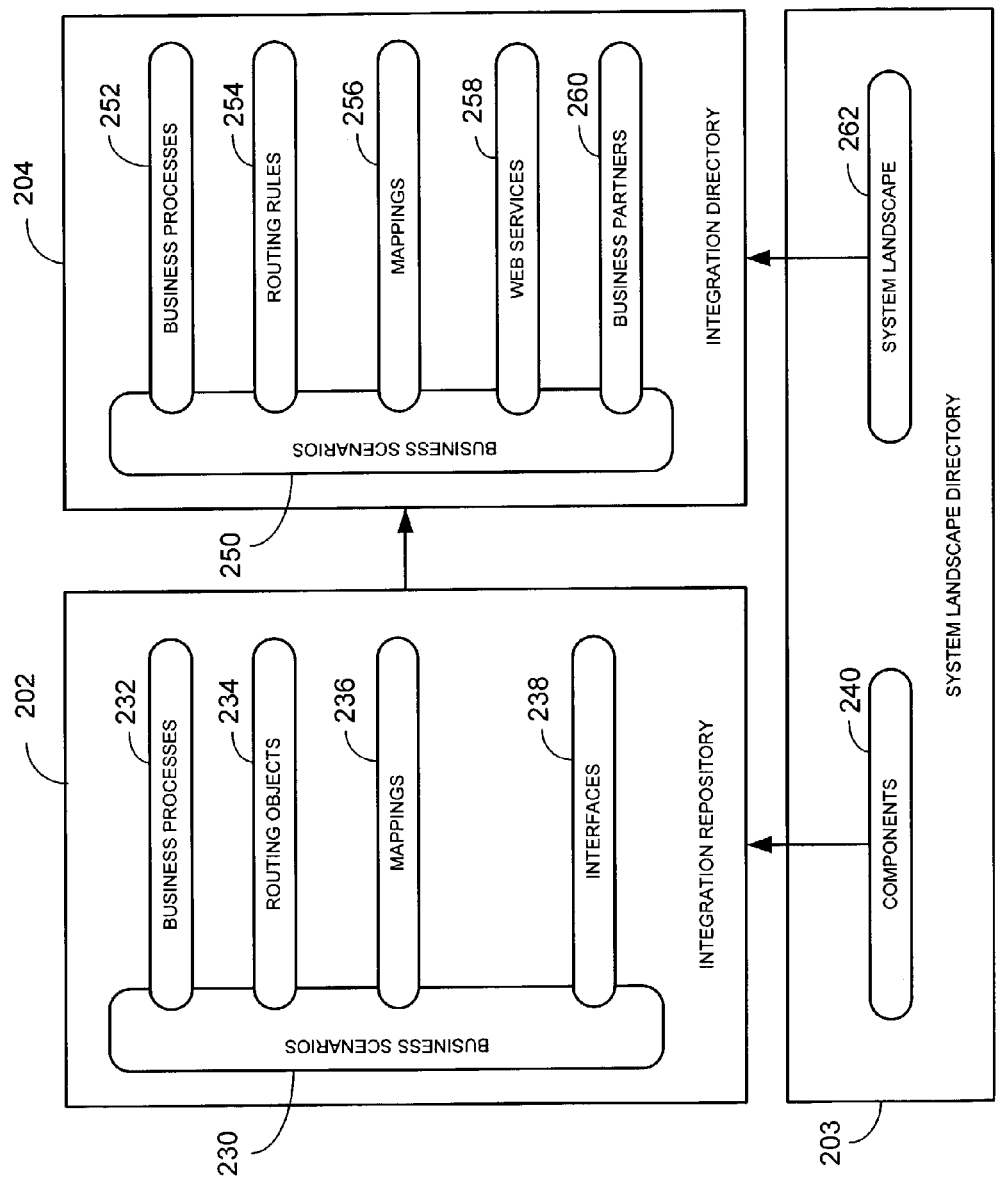
FIG. 4 is a detailed block diagram of the integration repository, integration directory, and system landscape directory.

The structure and operation of the integration repository 202, system landscape directory 203 and integration directory 204 will now be described in further detail. With reference to FIG. 4, the integration repository 202 includes descriptions of business processes 232, routing objects 234, mappings 236, and interfaces 238, all of which are defined according to one or more business scenarios 230. The business scenarios 230 of the integration repository 202 describe and configure message-based interaction between application components or business entities. A user can select one or more business scenarios 230 described in the integration repository 202 as a best practice for rapid configuration of the XI 110.

The business processes 232 are extensible compound Web services executed using a business process engine (not shown). Each business process 232 can be modeled centrally in the integration repository 202. A company or user designs each business process 232 according to its business needs, independently of the technical implementation. There may be several categories of business process 232 templates: i.e. generic business processes, industry-specific processes, and company-specific processes, for example. Each business process 232 identifies the Web services that are needed and that must be interconnected. In one specific implementation, business processes 232 are defined using a graphical interface, and then stored in a standardized format, such as Business Process Modeling Language (BPML) for example. The business process engine can then interpret and execute these models to drive collaboration among software components associated with the business process 232.

Routing objects 234 are predefined criteria to determine potential receivers of messages that must be distributed between software components and business partners during collaborative processing. Information about the routing objects 234 is used in determining receiving application(s) prior to processing a complete message for distribution, and to be able to reuse certain criteria across different interfaces and provide a more abstract view on these interfaces. Mappings 236 define transformations between message interfaces 238, message types, or data types in the integration repository 202 that may be required. These transformations include structural conversions and value mappings. Structural conversions are used for semantically equivalent types that are syntactically or structurally different, whereas value mapping may be used when an object is identified by different keys in multiple systems. In a specific implementation, a graphical mapping tool is provided to a user to assist in mapping, and transforming data is based on Extensible Stylesheet Language Transformation (XSLT), Java code, or any other code that could be generated by the graphical mapping tool.

The integration repository 202 is the central point of entry for interface development, storage and retrieval. To that end, the interface repository 202 includes one or more interfaces 238 representing interface descriptions of all message interfaces of all software components in the environment. The interface repository 202 even provides interfaces that may potentially be used in a certain environment, whether or not they are actually used in that environment. Accordingly, the interfaces 238 can be implemented on any component using any technology. In one implementation the interfaces 238 are based on WSDL, and many other implementations are possible. Message interfaces are made up of message types, which are in turn made up of data types. The data types can be described using XML Schema Definition Language (XSDL). An example of a data type is "address," which is used in the message type "Create PO" and can be reused for the message type "Create Invoice." Interfaces 238 can be arranged according to any classification, such as inbound and outbound, or synchronous and asynchronous.

The integration directory 204 contains detailed collaboration knowledge that describes the configuration of each component as installed in the system, i.e. the integration directory 204 is dependent on the concrete system landscape, versus the landscape-independent descriptions in the integration repository 202. The integration directory 204 details information from the integration repository 202 that is specific to that configuration, and can be filled automatically using generated content from the integration repository 202 or manually using graphical tools. In an exemplary implementation, the integration directory 204 is built on a Java platform and its content is represented via XML using open Internet standards. Like the integration repository 202, the integration directory 204 is open for third-party and partner collaboration knowledge. The integration repository 202 can be upgraded without affecting the integration directory 204 or any active runtime collaborative processes. The user then decides which changes should be transferred to the integration directory 204, either as predetermined automatic upgrades or manually via graphical tools.

The integration directory 204 includes descriptions of business scenarios 250, business processes 252, configured routing rules 254, and executable mappings 256. The integration directory 204 also includes descriptions of active Web services 258 and active business partners 260. The business scenarios 250 in the integration directory 204 represent the overall view of the interaction among interfaces and mappings 256 in the context of the actual configuration relevant for the specific implementation. The business processes 252 represents an executable description of all active business processes.

The routing rules 254 determine the receivers of a message on a business level. In one specific implementation, the content of a message is used as a routing rule 254. Other parameters may also be used. Relevant input parameters include the sender, the sender message type, the message to identify the receivers, and the receiver message type. The routing rules 254 can be described declaratively using XML Path Language (XPath, i.e. by using a graphical tool) or can be coded in Java. Information on the routing rules 254 is accessed by the runtime engine 214 (see FIG. 5) at runtime.

The routing rules 254 may use logical terms to describe senders and receivers to separate them from the physical address provided by the Web services 258 described in the integration directory 204. The physical address can therefore be changed without changing business-oriented content. Mappings 256 in the integration directory 204 represent mappings required in the runtime system landscape, in contrast to the integration repository mappings 236 that contains all supported mappings. Some new entries however, such as a new sequence of mappings, may be made only in the integration directory 204 to address additional Web services for mapping, for example. The runtime engine 214 accesses the integration directory mappings 256 at runtime.

Web services 258 describe implemented interfaces of the current system landscape, as well as active Web services supported by business partners. As such, Web services information can be exchanged with UDDI-compatible directories or added manually. Each Web service description also provides physical addressing details, access information, and other special attributes such as uniform resource locator (URL), protocol, and security information. In one implementation, the Web services 258 are described in WSDL, and SOAP and ebXML may be used for messaging protocols. The runtime engine 214 accesses information about the Web services 258 at runtime as well.

Business partners 262 defines usual information for business partners of a company such as names, addresses, and URLs, but may also contain more detailed and sophisticated information. For instance, the business partners 262 may include a description of the message formats the company's partner can directly receive and process, or of security protocols used for safe communications, or even trading terms. The kind of information stored in business partners 262 can be governed by company-specific decisions of the company using the XI 110.

The integration repository 202 and integration directory 204 use software component descriptions stored in the system landscape directory 203. The system landscape directory 203 includes design-time descriptions of components 240 for the integration repository 202 and a configuration-specific collaboration description of a system landscape 262 at runtime for the integration directory 204. The components 240 represent component descriptions that include information about application components, as well as information relating to their dependencies on each other. In a specific implementation, the component descriptions are based on the standard Common Information Model (CIM) of the Distributed Management Taskforce (DMTF). Since the integration repository 202 includes design-time information, only component-type information, independent of actual installation, is stored as components 240. The component descriptions can be added using an API or interactively using a graphical user interface.

The system landscape 262 describes the runtime system landscape actively using the XI 110. The system landscape 262 describes which components are installed and available on certain machines within the system, which instance or client was chosen, further information on the installed components, other system landscapes, and so on. The system landscape 260 is also based on an open architecture and can adhere to a widely accepted standard such as CIM. As such, many proprietary and third party components can be configured to automatically register themselves in the integration directory system landscape 260 upon being installed. Access interfaces to the system landscape 260 can be based on open standards as well, such as the Web-based Enterprise Management (WBEM) and SOAP standards.

With reference to a specific view of the integration directory 204, the system landscape directory 203 and the runtime engine 214 in FIG. 5, a collaborative runtime environment 270 for executing collaborative business processes will now be described. The collaborative runtime environment 270 integrates all runtime components relevant for exchanging messages among the connected software components and business partners. The collaborative runtime environment 270 is executed by the integration server 206 or Web application server 210, each of which can include an instance of a runtime engine 214, according to informational resources provided by the integration directory 204 and system landscape directory 203.

The runtime engine 214, which exchanges all messages between the various interconnected components, includes two layers: an integration layer 272 and a messaging and transport layer 280. The integration layer 272 includes a business process engine 274 for executing centrally modeled business processes, a logical routing service 276 and a mapping service 278. The messaging and transport layer 280 provides a physical address resolution service 282, a messaging and queuing service 284, and a transport service 286, preferably via HTTP. Other exchange services 216 in the integration server 206 can complement the runtime engine 214.

At runtime, business processes 252 are instantiated and executed by the business process engine 274 that executes the respective Web services described in Web services 258, independent of their location according to the business process model. Thus, a company can monitor and control the overall business processes in several ways: by tracking the actual step of a given process instance and the Web services that have been successfully completed; by reacting on events; and by integrating the work set and alert management of a portal infrastructure. The business process engine 274 is independent of the semantics of the executed business processes, and is configured as a mediator and facilitator of business processes 252 of their interaction with technical components.

Figure 6:
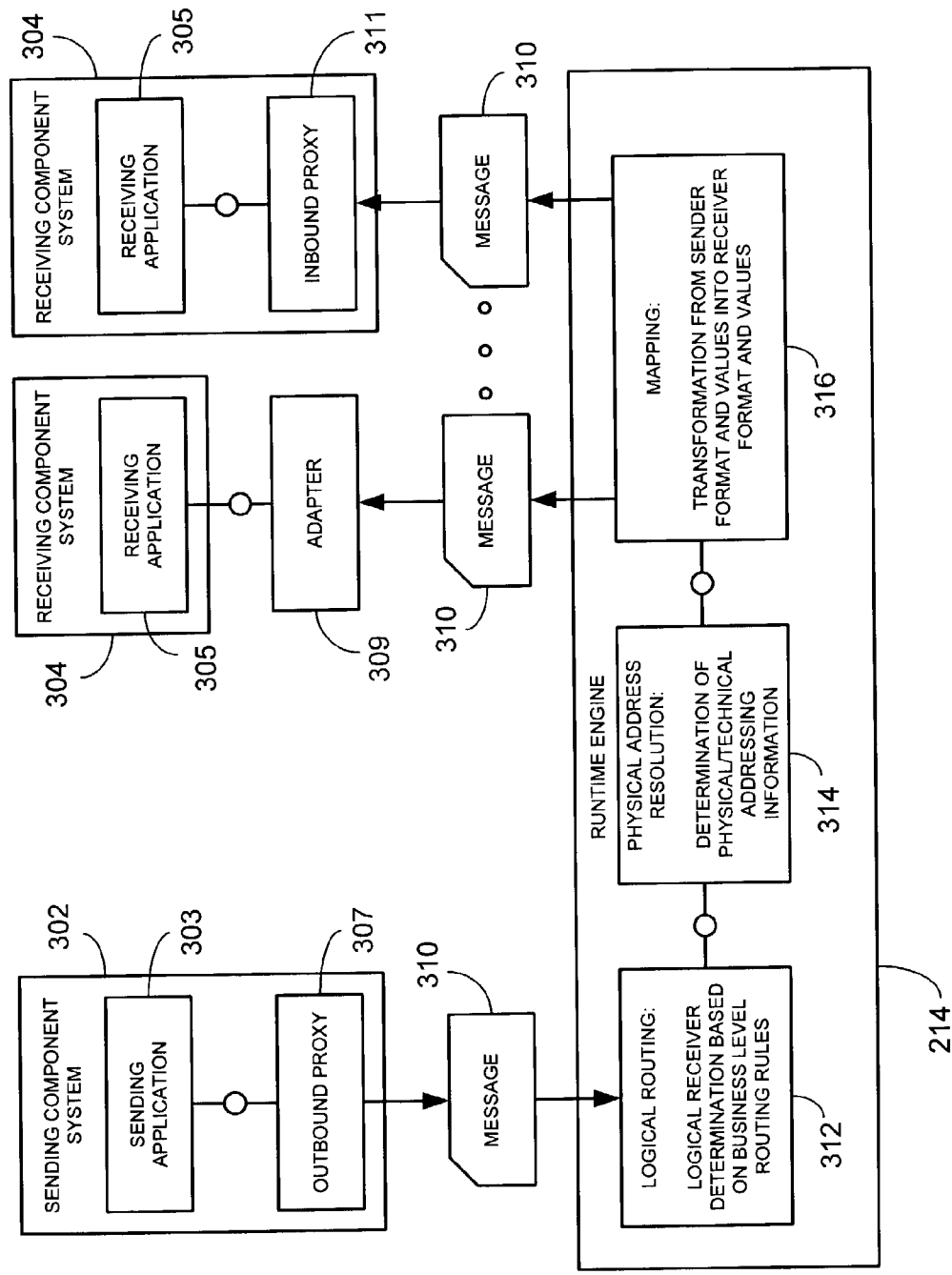
FIG. 6. is a block diagram illustrating a process for communicating a single message between two applications.

FIG. 6 is a block diagram illustrating several functions of the runtime engine 214 in a process of exchanging a message between applications. A sending application 303 resides in a sending component system 302, which represents the hardware and software platform of the sending application 303. One or more receiving applications 305 each reside in a receiving component system 304. A communication path for a message 310 can include an outbound proxy 307 at the outbound interface from the sending component system 302, through the runtime engine 214 and adapter 309 to the receiving component system 304. A receiving component system 304 may also utilize an inbound proxy 311 rather than an adapter. The configuration and connectivity of the shown receiving component systems 304 is merely exemplary, and it should be noted that such configuration and connectivity could take any number of forms. The pictured example illustrates both asynchronous and synchronous communication. In synchronous communication, routing and physical address resolution is only needed for the request as the response is transferred to the sender, which is already known.

Figure 5:
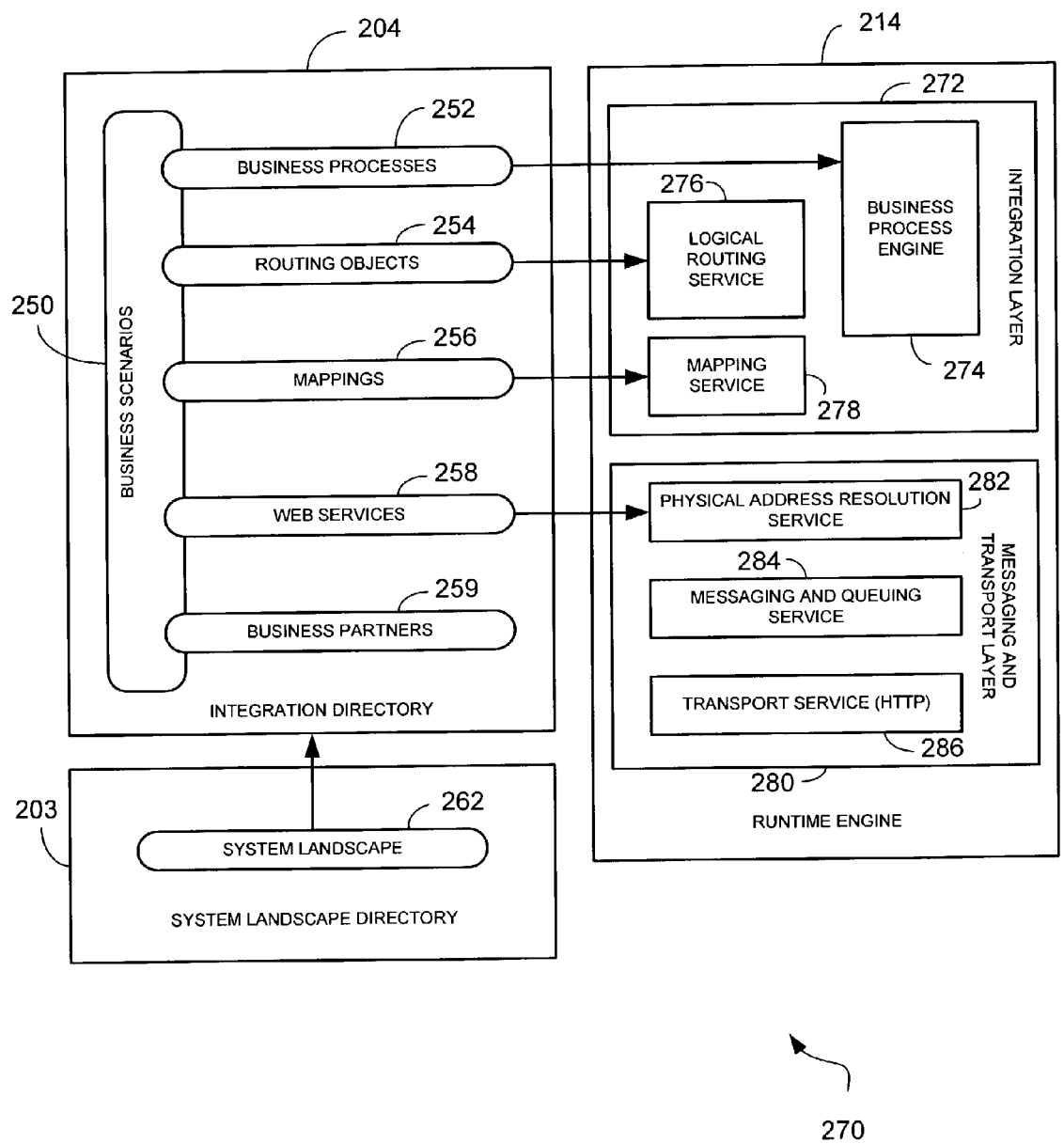
FIG. 5 is a detailed block diagram of a runtime environment of a runtime engine and informational resources of the integration directory.

With reference also to FIG. 5, for a given message the logical routing service 276 uses information on the sending application and the message interface to determine receivers and required interfaces by evaluating the corresponding routing rules, as shown at 312. The routing rules are part of the configuration-specific descriptions of the runtime system landscape provided by the integration directory 204, and can be implemented as XPath expressions or Java code. The mapping service 278 determines the required transformations that depend on message, sender, and sender interface, as well as the receiver and receiver interface, at 314. In the case of asynchronous communication, even the message direction is determined to appropriately transform input, output, and fault messages.

After retrieving the required mapping from the integration directory 204, the mapping service 278 can either execute XSLT mappings or Java code (or any combination in a given sequence) to the content of the sent message. Below the integration layer, messaging, queuing, and transport services 284 move the message to the intended or required receiver (s). After the message is transformed into the format expected by each receiver, the physical address of the required receiver service and other relevant attributes are retrieved from the integration directory 204 and mapped to the message, at 316.

A queuing engine in the messaging and queuing service 284 stores ingoing, outgoing, erroneous, and work-inprogress messages persistently. The messaging layer of the runtime engine 214 provides queuing functions for the physical decoupling of application components and guarantees messages are delivered exactly once according to a protocol (i.e. the "EO protocol"). The transport service 286 enables the runtime engine 214 to act as both a client and server. The transport service 286 implements a client that enables outbound communication and a server that handles inbound communication by accepting incoming documents. Additional server functions can address situations in which the receiver has no server by supporting polling over the transport protocol used. Preferably HTTP is used, but other transport protocols may be used as well.

Figure 7:
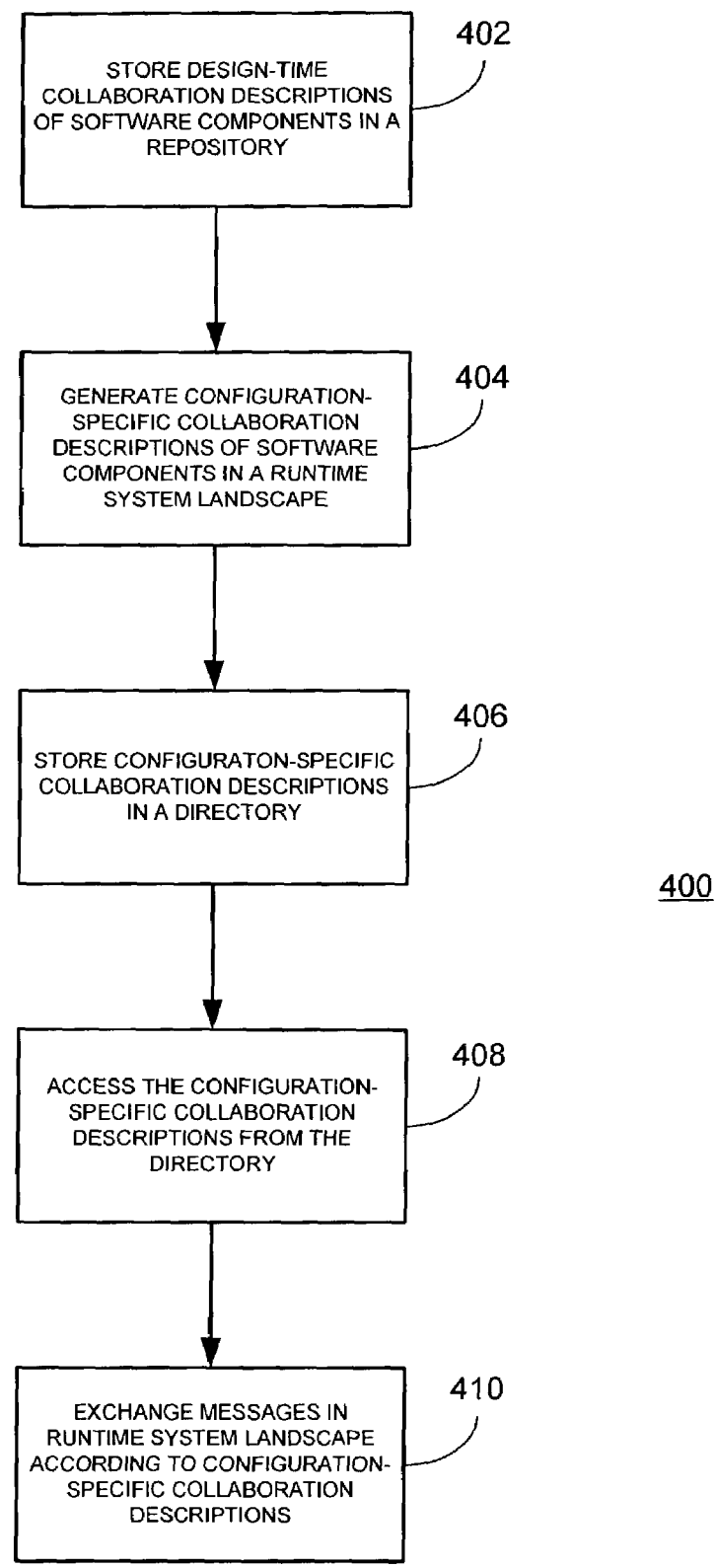
FIG. 7 is a flowchart of a method for integrating a heterogeneous collection of software components via an exchange infrastructure.

FIG. 7 illustrates a method for integrating a heterogeneous collection of software components utilizing an XI. At 402, design-time collaboration descriptions of software components are captured in a repository. The design-time collaboration descriptions include descriptions of business scenarios, business processes, routing objects, mappings, and interfaces that are to be used by software components for message-based exchange of information. Design-time descriptions of the software components themselves are stored in a system landscape directory for access by the repository.

At 404, configuration-specific collaboration descriptions are generated based on the design-time collaboration descriptions. The configuration-specific collaboration descriptions include descriptions of configured business processes, configured routing rules, active Web services, executable mappings, and active business partners. The configuration-specific collaboration descriptions relate to the specific system landscape at runtime, and are stored in a directory at 406. Once in the directory, the configuration-specific collaboration descriptions are accessible to a runtime engine, at 408, and used for message-based exchange of information among software components in the runtime system landscape, as shown at 410.

Figure 8:
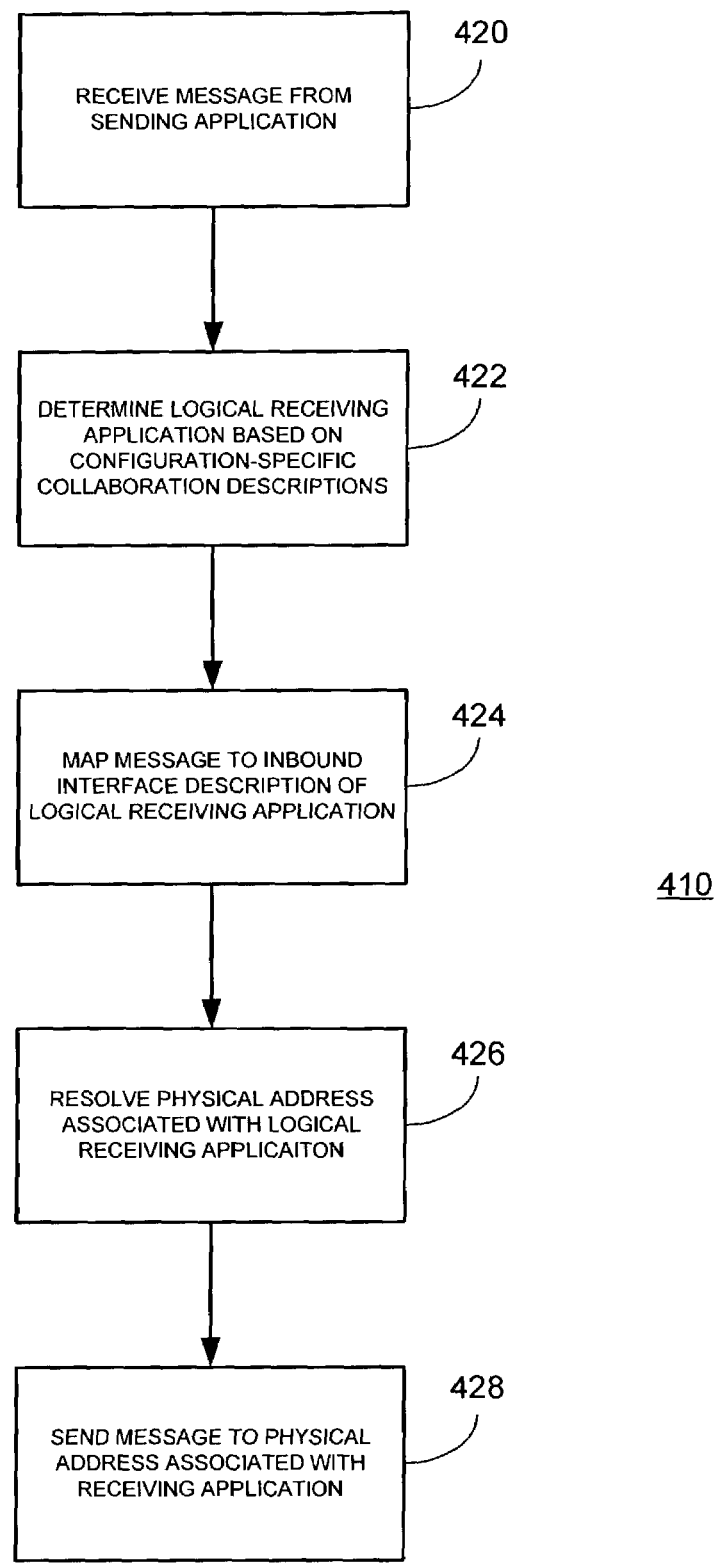
FIG. 8 is a flowchart of a method for exchanging message executed by the runtime engine of the exchange infrastructure.

FIG. 8 provides further details of a message exchange process 410, as executed by a runtime engine using information from the directory. At 420, a message is received at the XI from a sending application. The message may or may not specify a recipient; rather the content of the message can be used to determine which software components, and applications within those components, should receive the message to fulfill a specific business process. If a recipient's physical address is not already included with the message, at 422 the XI via the runtime engine determines one or more logical receiving applications based on the configuration-specific collaboration descriptions from the directory. The configuration-specific collaboration descriptions include message interface descriptions, including inbound interface descriptions of receiving applications and outbound interface descriptions of sending applications.

At 424, the runtime engine maps the message to one or more inbound interface descriptions associated with the one or more logical receiving applications. Accordingly, the physical address of the one or more logical receiving applications is resolved at 426. The runtime engine then appends the physical address to the message, and sends the message to each resolved physical address associated with a receiving application, as shown at 428. In this way, messages of any format, protocol or standard can be exchanged between software components connected to the XI, whether or not the software components share the same communication protocol or standard.

Although a few embodiments have been described in detail above, other modifications are possible. Other embodiments may be within the scope of the following claims.

The invention claimed is:

1. A system for integrating a heterogeneous collection of software components, comprising:
    a repository for storing design-time collaboration descriptions of a plurality of heterogeneous software components; and
    a processor and a memory configured using program code to provide a directory for storing configuration-specific collaboration descriptions of a runtime system landscape comprising at least a portion of the plurality of heterogeneous software components, the configuration-specific collaboration descriptions generated based on the stored design-time collaboration descriptions of at least the portion of the plurality of heterogeneous software components, the configuration-specific collaboration descriptions including a description of an interface of a receiving application, the description determined at runtime and configured to map a message to the interface of the receiving application.

2. The system of claim 1, wherein the design-time collaboration descriptions include business scenarios, business processes, routing objects, message transformation mappings and message interfaces for the plurality of software components.

3. The system of claim 2, wherein the configuration-specific collaboration descriptions include runtime descriptions of the business scenarios, business processes, routing objects, message transformation mappings and message interfaces for at least the portion of the plurality of software components.

4. The system of claim 1, further comprising a system landscape directory for storing a design-time component description of each software component, and for storing a configuration-specific component description of each software component in the runtime system landscape.

5. The system of claim 1, further comprising a runtime engine for executing message-based collaboration in the runtime system landscape according to the configuration-specific collaboration descriptions.

6. The system of claim 5, wherein the runtime engine is configured to:
    receive a message from a sending application;
    determine a logical receiving application of the message based on routing rules defined according to message interface descriptions accessed from the directory; and
    map the message from an outbound interface description associated with the sending application to an inbound interface description associated with the receiving application.

7. The system of claim 6, wherein the runtime engine is further configured to:
    determine a physical address associated with the receiver application; and
    send the message to the physical address associated with the receiver application.

8. The system of claim 5, wherein the runtime engine is stored on and executed by a server in communication with the at least a portion of the plurality of software components via a network.

9. The system of claim 1, wherein the repository further includes an application programming interface (API) for receiving design-time collaboration descriptions.

10. The system of claim 1, wherein the repository further includes a graphical user interface (GUI) for receiving design-time collaboration descriptions.

11. A method for integrating a heterogeneous collection of software components, comprising:
    storing design-time collaboration descriptions of a plurality of heterogeneous software components in a repository; and
    generating configuration-specific collaboration descriptions of a runtime system landscape that includes at least a portion of the plurality of heterogeneous software components; and
    storing the configuration-specific collaboration descriptions in a directory, the configuration-specific collaboration descriptions generated based on the stored design-time collaboration descriptions of at least the portion of the plurality of heterogeneous software components, the configuration-specific collaboration descriptions including a description of an interface of a receiving application, the description determined at runtime and configured to map a message to the interface of the receiving application.

12. The method of claim 11, further comprising: accessing the configuration-specific collaboration descriptions from the directory; and exchanging messages in the runtime system landscape according to the configuration-specific collaboration descriptions.

13. The method of claim 12, wherein the configuration-specific collaboration descriptions include message interface descriptions, and wherein the message interface descriptions include inbound and outbound interface descriptions for software components in the runtime system landscape.

14. The method of claim 13, wherein exchanging messages further includes:
    receiving a message from a sending application;
    determining a logical receiving application of the message based on routing rules defined according to the message interface descriptions accessed from the directory; and
    mapping the message from an outbound interface description associated with the sending application to an inbound interface description associated with the receiving application.

15. The method of claim 14, further comprising: determining a physical address associated with the receiving application; and
    sending the message to the physical address associated with the receiving application.

16. A method for integrating a heterogeneous collection of software components, comprising:
    receiving a message from a sending application; and
    determining a logical receiving application of the message based on routing rules defined according to configuration-specific collaboration descriptions stored in a directory, the configuration-specific collaboration descriptions generated based on the stored design-time collaboration descriptions of at least the portion of the plurality of heterogeneous software components, the configuration-specific collaboration descriptions including a description of an interface of a receiving application, the description determined at runtime and configured to map a message to the interface of the receiving application.

17. The method of claim 16, wherein the configuration-specific collaboration descriptions include message interface descriptions of software components in a runtime system landscape.

18. The method of claim 17, wherein the message interface descriptions include outbound interface descriptions and inbound interface descriptions of each application in the runtime system landscape, wherein each software component includes at least one application.

19. The method of claim 18, further comprising mapping the message from an outbound interface description associated with the sending application to an inbound interface description associated with the logical receiving application to resolve a physical address associated with a receiving application.

20. The method of claim 16, further comprising sending the message to the physical address associated with the receiving application.

* * * * *